2,816,131
CYANOFORMYL FLUORIDE AND PROCESS THEREFOR

Charles W. Tullock, Wilmington, Del., assignor to E. I. du Pont de Nemours and Company, Wilmington, Del., a corporation of Delaware No Drawing. Application November 22, 1955, Serial No. 548,540

6 Claims (Cl. 260—465.7)

This invention relates to a new, simple organic fluorine compound containing a cyano group and to a method of preparing it.

This invention has among its objects a new chemical compound and a process for preparing the same. Another object is the provision of a new fumigant. A further object is the provision of a new intermediate. Other objects will appear hereinafter.

These objects are accomplished by the invention of cyanoformyl fluoride,

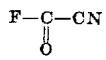

which may also be called fluorocarbonyl cyanide or fluoroformyl cyanide, and of the process which comprises reacting a carbonyl halide, at a temperature above about 0° C., with hydrogen cyanide, the two reactants being used in a molar ratio between about 1:0.5 and 1:1.5, and with an alkali metal fluoride in amount of at least one mole per mole of carbonyl halide.

The mechanism of the reaction which gives rise to cyanoformyl fluoride is not clearly understood. Even when the carbonyl halide reacted with hydrogen cyanide is carbonyl fluoride, $COF_2$, the mechanism appears to be a complex one since substantially no reaction takes place in the absence of alkali metal fluoride. That other carbonyl halides, for example phosgene, would also react with hydrogen cyanide and alkali metal fluorides to give cyanoformyl fluoride was totally unexpected particularly since experimental evidence showed that neither sodium fluoride nor sodium acid fluoride nor mixtures of the two react with phosgene to any appreciable extent, the sole product from 24–48 hours' contact between these compounds at room temperature and autogenous pressure being very small amounts, of the order of 1% in the gas mixture, of carbonyl chlorofluoride, FCOCl.

The preparation of cyanoformyl fluoride is preferably carried out as follows: The three reactants, i. e., carbonyl halide, hydrogen cyanide and alkali metal fluoride (sodium fluoride is the preferred one but others, such as potassium fluoride, are also suitable) are placed in a stainless steel cylinder and allowed to react under autogenous pressure and at ambient temperature, e. g., 15–25° C., or at slightly elevated temperature, e. g., up to 50–60° C. The reaction is mildly exothermic and the internal temperature rises spontaneously from room temperature to about 50° C. Contact is continued for a sufficient time to bring about appreciable conversion, e. g., from 12 hours to several days. The gaseous reaction product is then separated from the solid material and the cyanoformyl fluoride can be isolated therefrom by distillation in a low temperature still. Cyanoformyl fluoride is a gas boiling at −29 to −32° C. Other compounds present in the gaseous reaction product are unchanged hydrogen cyanide and carbonyl fluoride, when the latter is the starting material. When another carbonyl halide, such as phosgene, is used as the starting material, the product also contains carbonyl fluoride, which is formed in the reaction together with cyanoformyl fluoride. The solid reaction product contains the alkali metal fluoride and acid fluoride, and the metal halide corresponding to the carbonyl halide, other than carbonyl fluoride, which is used. There is also normally formed large amounts of a brown resinous solid containing no fluorine, which can be separated from the inorganic salts by extraction with hot methanol.

While when using carbonyl fluoride as the starting material, the carbonyl fluoride and the hydrogen cyanide can be first heated at 100–200° C. under autogenous pressure for a few hours, then the mixture brought in contact with the alkali metal fluoride and treated as described, this procedure is not preferred since the preliminary heating period seems to be largely unnecessary.

The preferred carbonyl halide for use in making cyanoformyl fluoride is phosgene, since it is the cheapest. The next most desirable carbonyl halide is carbonyl fluoride, which can be prepared from silver II fluoride and carbon monoxide [Ruff et al., Z. Anorg. allgem. Chem. 221, 154 (1934)] or from hydrogen fluoride and phosgene, and especially by the method, whereby it is obtained free from hydrogen chloride, of reacting hydrogen fluoride with phosgene at a temperature of at least 50° C. and preferably 150–300° C. and contacting the reaction mixture, with or without a preliminary separation from unreacted phosgene and/or hydrogen fluoride, with at least a stoichiometric amount, based on the hydrogen chloride and any hydrogen fluoride in the reaction product, of sodium or other alkali metal fluoride (the stoichiometric amount of sodium fluoride is two moles per mole of hydrogen chloride plus one mole for any mole of hydrogen fluoride). Carbonyl bromide can also be used in the process of the present invention as well as mixed carbonyl halides, e. g., carbonyl chlorofluoride, COFCl, etc.

The carbonyl halide and the hydrogen cyanide should be used in such proportions that there is present from about 0.5 to about 1.5 moles of hydrogen cyanide per mole of carbonyl halide. A large excess of hydrogen cyanide is to be avoided since experience has shown that it increases the formation of by-products, to the point where, at very large excess, there is practically no cyanoformyl fluoride in the reaction product. Preferably, the carbonyl halide and the hydrogen cyanide are used in approximately equimolar amounts.

Since the mechanism of the reaction is uncertain, it cannot be stated accurately how much alkali metal fluoride is necessary. One of the functions, perhaps the main one, of this reactant is to absorb the hydrogen fluoride and any other halogen halide formed in the reaction. The presence of an alkali metal fluoride is, of course, essential as a source of fluorine when using a carbonyl halide other than carbonyl fluoride and, as already mentioned, it is essential even when carbonyl fluoride is used. Experience has shown that, for good results, there should be used at least one mole of alkali metal fluoride per mole of carbonyl halide. When a carbonyl halide other than carbonyl fluoride is used, it is desirable to use at least three moles of alkali metal fluoride per mole of carbonyl halide, i. e., one mole of alkali metal fluoride per mole of carbonyl halide plus one mole of alkali metal fluoride per atom of halogen other than fluorine, i. e., per atom of halogen of atomic number greater than 9 in the carbonyl halide.

The following examples in which parts are by weight are illustrative of the invention.

Example 1

A corrosion-resistant bomb of one liter capacity was charged with 27 g. (1.0 mole) of hydrogen cyanide, freshly distilled from phosphoric anhydride and stabilized by the addition of 3 drops of glacial acetic acid, and 66 g.

(1.0 mole) of carbonyl fluoride, which infrared analysis had shown was at least 95% pure. The bomb was heated at 150° C. for 3 hours and the resulting gaseous product was distilled into a stainless steel cylinder containing 130 g. (3.1 moles) of sodium fluoride. After allowing the reaction to proceed at ambient temperature (20–25° C.) and under autogenous pressure for 11 days, there remained 39 g. of gaseous product, which was transferred to another cylinder. The solid product (inorganic salts and absorbed organic material) weighed 183 g. It contained 4.79% nitrogen and 45.29% fluorine.

The cylinder containing the gaseous reaction product was cooled to 0° C. and the material which was gaseous at this temperature was slowly bled out through a series of two traps at −18° C., followed by two traps at −78° C. The product condensed in the latter (24 g.) was distilled through a low temperature column. There was thus obtained 10 g. of a material boiling at −29 to −32° C., which mass spectrographic analysis showed to consist, on a molar basis, of 90% cyanoformyl fluoride, 3% hydrogen cyanide, 2% carbon dioxide and 2% carbonyl fluoride. The identity of the cyanoformyl fluoride was further established by gas density determinations, indicating molecular weights of 72 and 74 (calculated, 73); by infrared analysis; and by its reaction with aniline, which gave diphenylurea. Cyanoformyl fluoride is a colorless gas which is stable at temperatures as high as 350° C.

The solid product of this reaction (inorganic salts and organic material) was washed with diethyl ether, then extracted with boiling methanol. The extract contained 16 g. of a brown resinous material containing 20.88% nitrogen, 40.81% carbon, 3.71% hydrogen, and no fluorine.

*Example II*

In a 300 ml. stainless steel cylinder was placed 60 g. (1.43 moles) of sodium fluoride and 14.3 g. (0.53 mole) of hydrogen cyanide. The cylinder was cooled in liquid nitrogen and evacuated, and there was distilled into it 31 g. (0.47 mole) of carbonyl fluoride. When the cylinder was allowed to warm up to room temperature a moderately exothermic reaction took place which raised the temperature to 40–45° C. After 24 hours' contact at room temperature, there was obtained 24 g. of gaseous reaction product which infrared analysis showed to contain, on a molar basis, 20–30% cyanoformyl fluoride, the remainder being unreacted carbonyl fluoride and hydrogen cyanide, together with a small amount of carbon dioxide. By precision distillation the cyanoformyl fluoride can be separated from the mixture.

When this reaction was essentially duplicated except that the sodium fluoride was omitted, infrared analysis indicated that the gas obtained after 23 days' contact contained only 1–3% of cyanoformyl fluoride.

*Example III*

To a cold 300 ml. stainless steel cylinder was added 46 g. (0.46 mole) of phosgene, 9 g. (0.33 mole) of hydrogen cyanide and 100 g. (2.38 moles) of sodium fluoride. There was a spontaneous temperature rise when the cylinder was allowed to warm up to room temperature. After 48 hours' contact at room temperature, there remained 26 g. of gaseous reaction product. Infrared analysis indicated that this gas contained, on a molar basis, 20–35% cyanoformyl fluoride, together with unreacted hydrogen cyanide and a large amount of carbonyl fluoride. It contained no detectable amount of phosgene. The sodium fluoride and absorbed material weighed 127 g. This solid contained 2.56% carbon, 0.44% hydrogen, and 2% nitrogen. X-ray analysis of this solid showed that sodium fluoride, sodium chloride and sodium hydrogen fluoride were present; no sodium cyanide was detected.

*Example IV*

A mixture of 400 g. (9.5 moles) of sodium fluoride, 204 g. (2.06 moles) of phosgene and 55 g. (2.04 moles) of hydrogen cyanide was evenly divided between two 500 ml. stainless steel cylinders. After 2 days' contact at room temperature, the combined gaseous reaction products weighed 110 g. To this was added the 10 g. of gaseous reaction product obtained from a similar reaction of 34 g. phosgene, 9.5 g. hydrogen cyanide and 100 g. of sodium fluoride. The composite product (120 g.) was transferred to a cold still pot to which 50 ml. of n-heptane was added as a "chaser." Upon distillation of the mixture in a low temperature still whose head was cooled to −77° C., 65.5 g. of low boiling material, mainly carbonyl fluoride (B. P. −83° C.) was removed. There was then obtained 20 g. of distillate boiling in the cyanoformyl fluoride range, which was shown by infrared analysis to contain 80—85% cyanoformyl fluoride, with approximately 10% hydrogen cyanide and 5% carbonyl fluoride. This can be further purified, e. g., by passing through a sodium fluoride tower at about 40-50° C. In addition, there was obtained 34.5 g. of product distilling in the hydrogen cyanide range, which by infrared analysis contained approximately 80% hydrogen cyanide, 5% cyanoformyl fluoride, 10% phosphate and some n-heptane. A resinous solid was left in the still.

Cyanoformyl fluoride is a powerful fumigating agent for use against roaches, rodents and other pests. It is also useful as an intermediate in chemical syntheses, for example in the preparation of diaryl ureas by reaction with primary or secondary arylamines.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. Cyanoformyl fluoride.
2. Process which comprises contacting hydrogen cyanide with a carbonyl halide in the presence of an alkali metal fluoride for a time sufficient to react the ingredients.
3. Process which comprises contacting hydrogen cyanide with phosgene in the presence of an alkali metal fluoride for a time sufficient to react the ingredients.
4. Process which comprises contacting hydrogen cyanide with a carbonyl halide in the presence of sodium fluoride for a time sufficient to react the ingredients.
5. Process which comprises contacting one mole of phosgene with about one mole of hydrogen cyanide and about three moles of sodium fluoride for a time sufficient to react the ingredients.
6. Process which comprises contacting carbonyl fluoride with hydrogen cyanide in the presence of sodium fluoride for a time sufficient to react the ingredients.

References Cited in the file of this patent

UNITED STATES PATENTS

| | | |
|---|---|---|
| 2,567,011 | Diesslin et al. | Sept. 4, 1951 |
| 2,704,769 | Zerte | Mar. 22, 1955 |
| 2,730,543 | Rendall et al. | Jan. 10, 1956 |

FOREIGN PATENTS

| | | |
|---|---|---|
| 117,464 | Australia | Sept. 1, 1943 |

OTHER REFERENCES

Chem. Abst. Decennial Index, vol. 31–40 (1937–46), p. 6003.

Chem. Abst., vol. 48, Formula Index, p. 11F (1954).

UNITED STATES PATENT OFFICE
CERTIFICATE OF CORRECTION

Patent No. 2,816,131                              December 10, 1957

Charles W. Tullock

It is hereby certified that error appears in the printed specification of the above numbered patent requiring correction and that the said Letters Patent should read as corrected below.

Column 3, lines 41 and 42, for "maderately" read --moderately--; column 4, line 26, for "phosphate" read --phosgene--.

Signed and sealed this 18th day of February 1958.

(SEAL)
Attest:
KARL H. AXLINE
Attesting Officer

ROBERT C. WATSON
Commissioner of Patents